W. L. KENY.

HYDRAULIC CEMENT BLOCK MAKING MACHINE.

APPLICATION FILED JULY 15, 1911.

Reissued Sept. 22, 1914.

13,803.

4 SHEETS—SHEET 1.

Witnesses
Geo. Fuckel
Wayne Foard

Inventor
William L. Keny
by Linard & Linard
his Attorneys

THE NORRIS PETERS CO. PHOTO-LITHO., WASHINGTON, D. C.

W. L. KENY.

HYDRAULIC CEMENT BLOCK MAKING MACHINE.

APPLICATION FILED JULY 15, 1911.

Reissued Sept. 22, 1914.

13,803.

4 SHEETS—SHEET 2.

Witnesses
Benj. Finckel
Mayme Foard

Inventor
William L. Keny
by Finnegan & Finnegan
his Attorneys

THE NORRIS PETERS CO., PHOTO-LITHO., WASHINGTON, D. C.

W. L. KENY.

HYDRAULIC CEMENT BLOCK MAKING MACHINE.

APPLICATION FILED JULY 15, 1911.

Reissued Sept. 22, 1914.

13,803.

4 SHEETS—SHEET 3.

Witnesses
Geo. Finckel
Mayme Foard

Inventor
William L. Keny
by Finch & Finch
his Attorneys

THE NORRIS PETERS CO., PHOTO-LITHO., WASHINGTON, D. C.

W. L. KENY.

HYDRAULIC CEMENT BLOCK MAKING MACHINE.

APPLICATION FILED JULY 15, 1911.

Reissued Sept. 22, 1914.

13,803.

4 SHEETS—SHEET 4.

Witnesses

Benj. Tuckel

Mayne Foard

Inventor

William L. Keny by Fincel & Fincel his Attorneys

THE NORRIS PETERS CO., PHOTO-LITHO., WASHINGTON, D. C.

UNITED STATES PATENT OFFICE.

WILLIAM L. KENY, OF MARION, OHIO, ASSIGNOR, BY DIRECT AND MESNE ASSIGNMENTS, TO THE JAEGER MACHINE COMPANY, OF COLUMBUS, OHIO, A CORPORATION.

HYDRAULIC CEMENT-BLOCK-MAKING MACHINE.

13,803. Specification of Reissued Letters Patent. Reissued Sept. 22, 1914.

Original No. 960,953, dated June 7, 1910, Serial No. 499,902. Application for reissue filed July 15, 1911. Serial No. 638,763.

*To all whom it may concern:*

Be it known that I, WILLIAM L. KENY, a citizen of the United States, residing at Marion, in the county of Marion and State of Ohio, have invented certain new and useful Improvements in Hydraulic Cement-Block-Making Machines, of which the following is a specification.

This invention relates to hydraulic cement block making machines, the object of said invention being to provide an improved device of this character in which various operations are carried out by means of elements actuated by hydraulic rams.

Further objects and advantages of the invention will be set forth in the detailed description which now follows.

Figure 1:
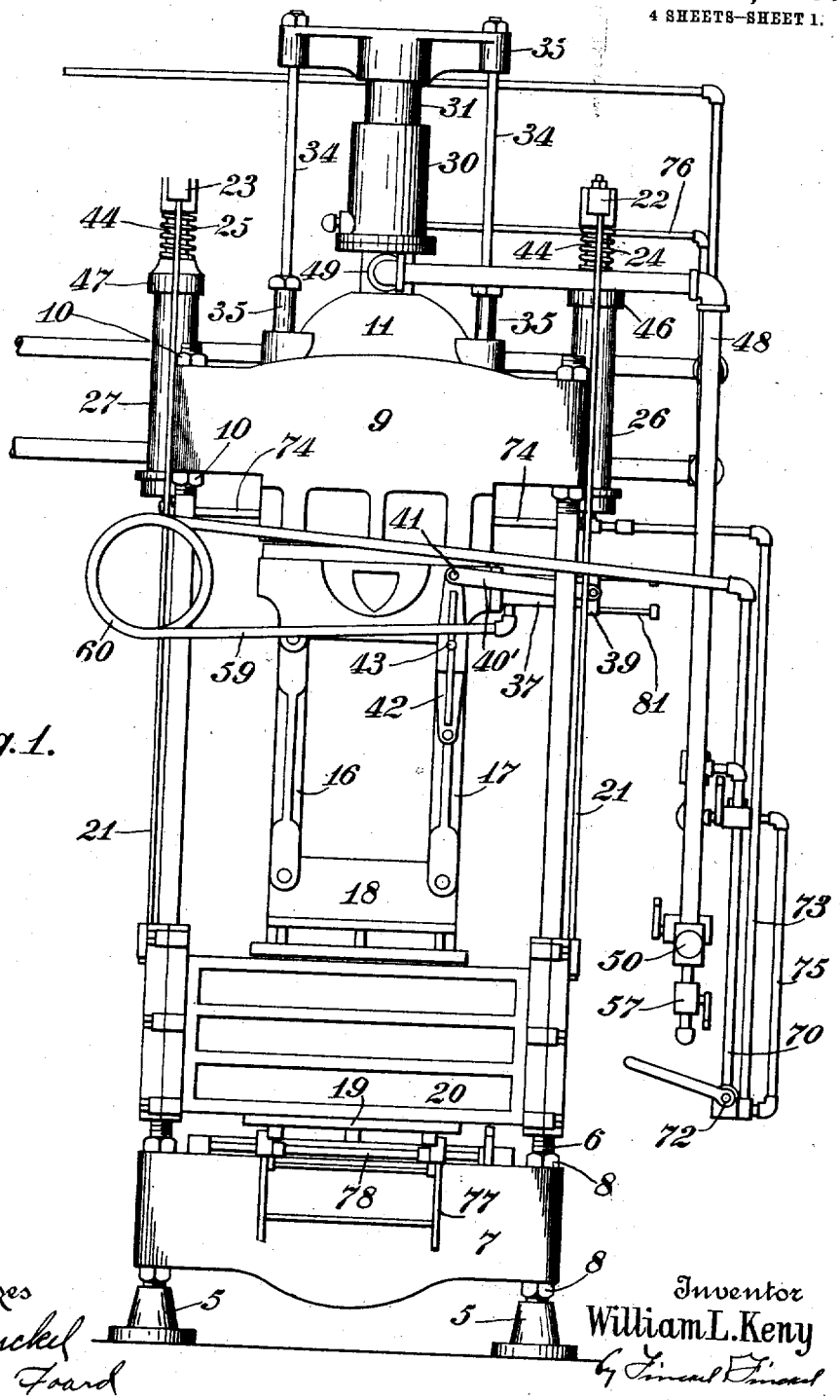
Figure 2:
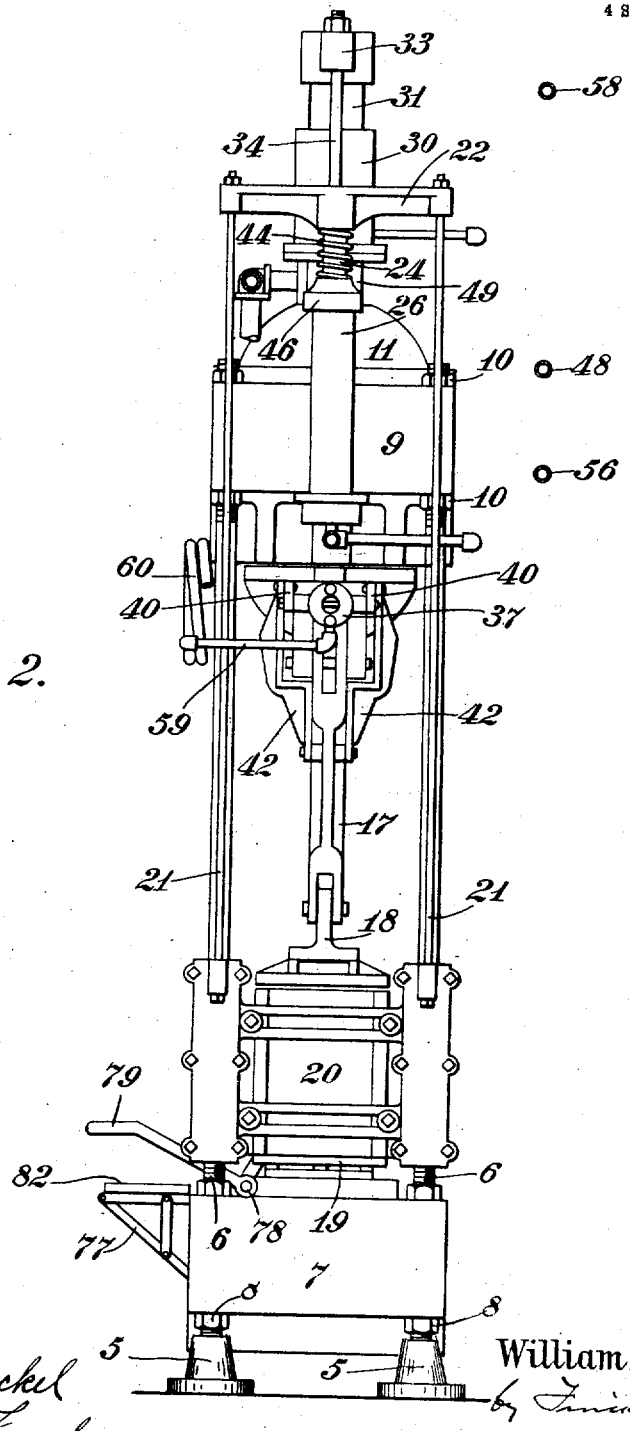
Figure 3:
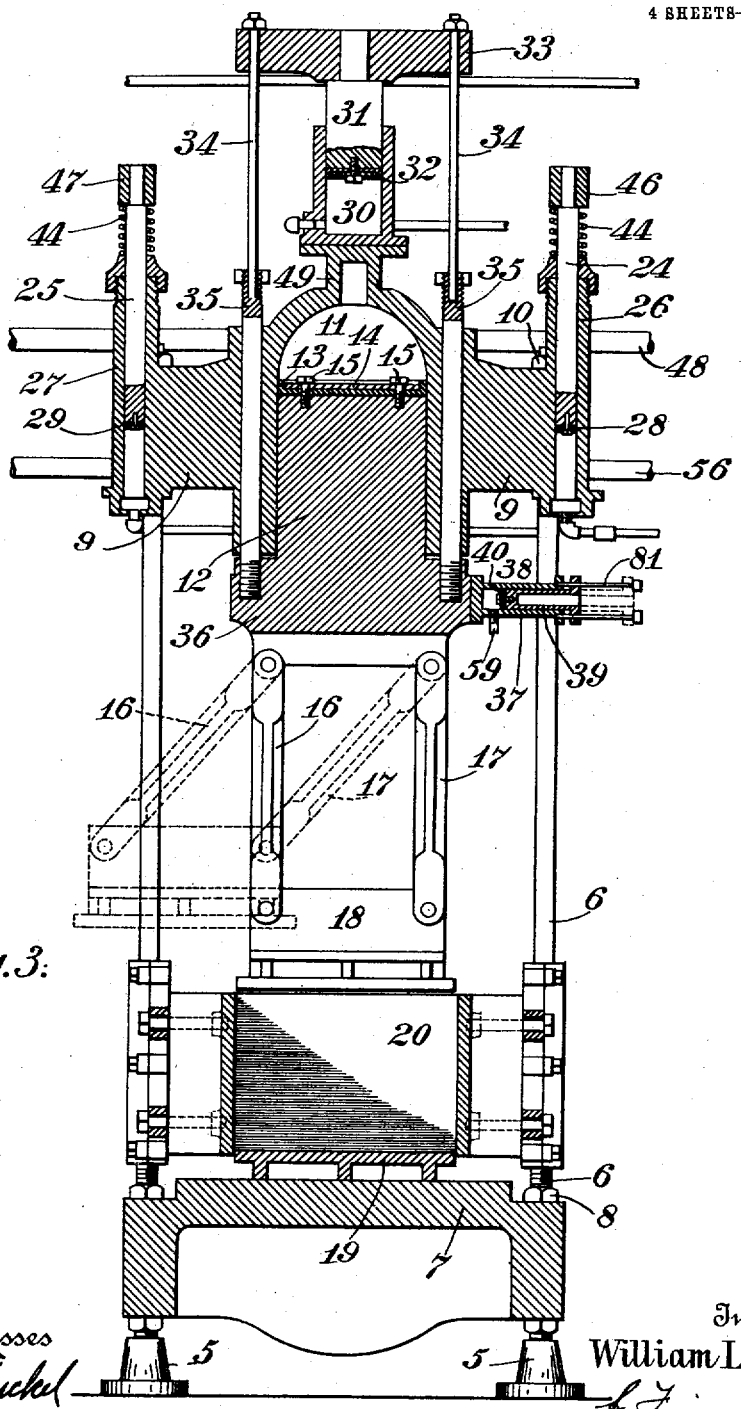
Figure 4:
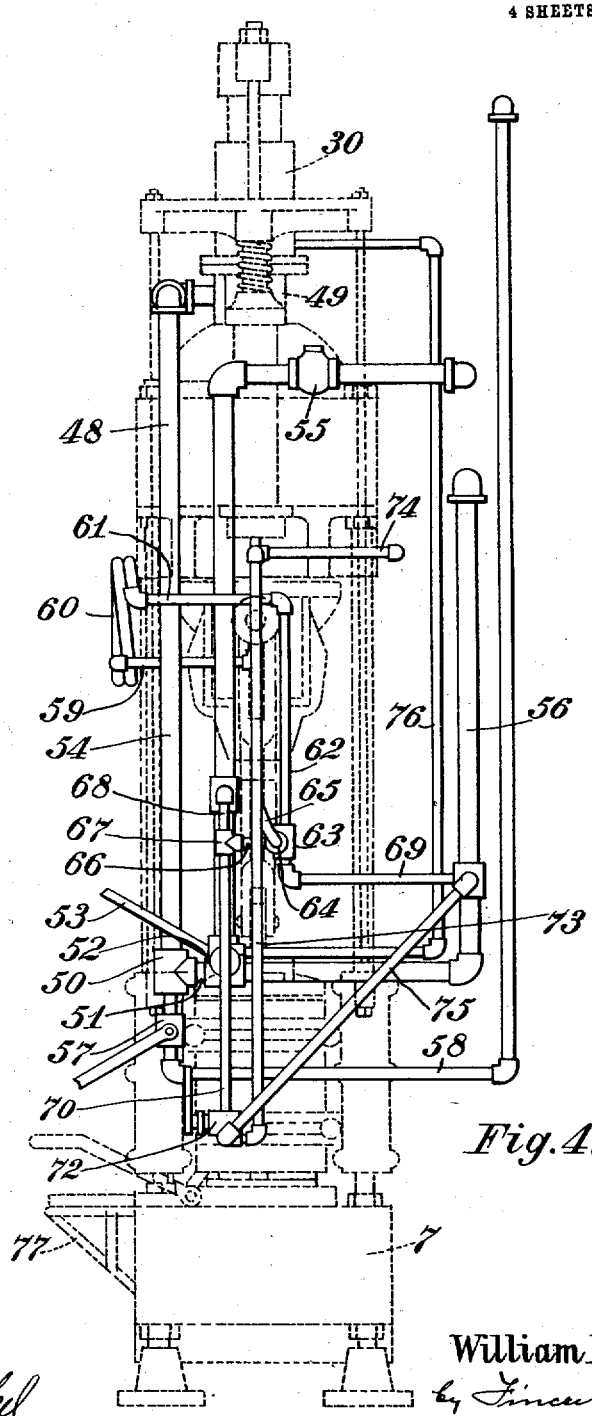

In the accompanying drawings: Figure 1 is a front elevation of a block making machine constructed in accordance with the invention, Fig. 2 is a side elevation thereof, Fig. 3 is a central vertical section thereof, and, Fig. 4, is a view of the piping for conducting fluid under pressure to the various rams, the machine itself being illustrated in dotted lines.

Like numerals designate corresponding parts in all of the figures of the drawings.

Referring to the drawings, it will be seen that the machine comprises supporting blocks 5 from which rise guide rods 6. A base block 7 is held rigidly in position upon these guide rods by locking nuts 8. A head block 9 is held in position upon these guide rods by nuts 10. Located within the head block 9 is the cylinder 11 of a hydraulic ram. The plunger 12 of said ram has a cup leather 13 clamped upon its upper face by a plate 14 and screws 15, the purpose of this cup leather being to provide a fluid-tight contact between the plunger and the wall of the cylinder 11.

Pivoted to the lower portion of the plunger 12 are links 16 and 17, said links being pivotally connected at their lower ends to a presser head 18. A pallet 19 rests upon the base block 7 and is adapted to enter a mold box 20. This mold box is slidably disposed upon the guide rods 6. Rods 21 extend upwardly from the corners of the mold box and are connected to cross heads 22 and 23. These cross heads are in turn mounted upon the plungers 24 and 25 of rams 26 and 27. These plungers carry cup leathers 28 and 29 similar to the cup leather 13. An additional hydraulic ram 30 is mounted upon the head block 9 and the plunger 31 thereof carries a cup-leather 32 like those hereinbefore described. A cross head 33 is mounted upon the upper end of the plunger 31 and this cross head is connected by rods 34 and bars 35 with the plunger 12, said bars 35 being threaded into shoulders 36 of said plungers and the rods 34 being threaded into the upper ends of the bars 35. The cylinder 37 of still another hydraulic ram 38 is mounted upon the plunger 12 and moves therewith. The plunger 39 of this last named ram carries a cup leather 40 like those hereinbefore described.

As is best illustrated in Fig. 1, the plunger 39 has links 40′ connected thereto, said links being in turn pivotally connected at 41 to rock levers 42. These rock levers are pivoted at 43. It will therefore be apparent that when fluid under pressure is admitted to the cylinder 37 and the plunger 39 is forced outwardly, said levers will be rocked upon their pivots to throw the links 16 and 17 and head 18 over to the position illustrated in dotted lines in Fig. 3. Springs 44 encircle the plungers 24 and 25 and bear between the cross heads 22 and 23 and the caps 46 and 47 of the rams 26 and 27.

A low pressure fluid supply pipe 48 leads from a neck extension 49 of the ram cylinder 11 to a three-way nipple 50. A coupling 51 connects this nipple with a three-way valve casing 52, said valve being operated by a handle 53. The low pressure pipe is continued at 54 from the casing of this three-way valve, to a source of fluid under comparatively low pressure. A check valve 55 is located in this low pressure supply pipe and prevents high pressure fluid from a source hereinafter described, from passing through the low pressure pipe to the low pressure pump, not shown. An exhaust pipe 56 leads from the three-way valve casing 52. A two-way valve 57 is located in a high-pressure supply pipe 58.

A low pressure supply pipe 59 leads from the ram cylinder 37 and is formed into a coil at 60 in such way that the coil will yield after the manner of a spiral spring, to permit the cylinder 37 to move with the plunger 12 without injuring the pressure supply pipe. This pressure supply pipe is continued at 61 and 62 to the casing 63 of a two-way valve 64. A handle 65 provides means for operating this valve. A branch pipe 66, connection 67 and pipe 68 establish communication between the casing 63 and the low pressure supply pipe 54. An exhaust pipe 69 leads from casing 63 to the exhaust pipe 56. Still another branch pipe 70 leads from the connection 67 to the casing 72 of a three-way valve. This valve controls the flow of fluid under pressure through a pipe 73 to the rams 26 and 27. A branch pipe 74 leads from the pipe 73 to the ram 26. An exhaust pipe 75 leads from the casing 72 to the exhaust pipe 56. A supply pipe 76 leads from the casing 52 to the cylinder 30. A supporting bracket 77 extends from the front face of the base block 7 and serves a purpose that will be hereinafter described. The pallet 19 is hingedly mounted upon a rod 78 and is provided with an arm 79 which when pressed upon, swings the pallet upon its hinge rod to turn the molded block over upon its side until it rests upon the bracket 77.

The operation of the device is as follows: The pallet 19 is swung over to the position illustrated in Fig. 2 or until it underlies the mold box 20. By then turning the valve 72 to such position as to bring the pipes 73 and 74 that control the rams 26 and 27, into communication with exhaust pipes 75 and 56, the mold box is permitted to descend as the fluid escapes from said rams through said exhaust pipes. The springs 80 bear between the cross heads 22 and 23 and the caps 46 and 47 limit the descent of the mold box to a point where the lower edge of the mold box lies just below the pallet and therefore yieldingly hold the mold box spaced from the base block 7 for a purpose which will be hereinafter set forth. By now actuating the handle 65 of valve 64 to admit fluid to ram 38 from the low pressure supply pipe 54 through the connections hereinbefore described, the head 18 will be swung over to the dotted line position illustrated in Fig. 3. This is accomplished by the outward movement of the plunger 39 acting through the links 40′ to pull the upper ends of the levers 42 toward the right in Fig. 1. This throws the lower ends of said levers toward the left and since the lower ends of these levers 42 are connected to the links 17, it follows that both links 16 and 17 and the head 18 will be thrown toward the left in Fig. 3. Guide rods 81 support the plunger 39 during its outward movement.

With the head 18 swung over to the position illustrated in dotted lines in Fig. 3, a concrete mixture consisting of cement, sand, water and crushed stone if desired, may be placed in the mold box, where it rests upon the pallet 19. After the mold box has been filled to the proper level, the handle 65 is moved to bring the ram 38 into communication with the exhaust pipe 56 through pipe 69. The escape of fluid from the ram, permits the head 18 to swing back into vertical alinement with the plunger 12. Material in the mold box is now ready to be compressed and this invention contemplates a preliminary compressing of the material by a ram acting under comparatively low pressure and a final compression of the material by said ram when subjected to high pressure, together with means for permitting the mold box, to move downwardly with the compressed material, for a limited distance, this downward movement of the mold box resulting in what is practically an upward movement of the pallet within the mold box, whereby the compressed material will be subjected to substantially the same pressure upon its lower face as upon its upper face. These objects are accomplished as follows: By operating the handle 53 to bring the cylinder 11 into communication with the low pressure supply pipe 54, fluid under comparatively low pressure is admitted to said cylinder and the plunger 12 is thereby forced downwardly. This imparts a preliminary compression to the material within the mold box 20. By actuating the valve 57, the supply pipe of the cylinder 11 is brought into communication with the high pressure supply pipe 58. At this time the check valve 55 prevents the fluid under said high pressure from passing up through the low pressure supply pipe, when this high pressure fluid is admitted to the cylinder 11 and still further compression is imparted to the material within the mold box 20. This compression of the material within the mold box of course tends to force said material outwardly in all directions, said material acting thereby to carry the mold box downwardly around the pallet 19 with the result that the material is compressed substantially as much upon its lower face as upon its upper face. The yielding mounting of the mold box upon the springs 44 permits this action to take place.

Heretofore ordinarily the adhesion of the particles of compressed material to each other and to the sides of the mold box, has to a certain extent protected the lowermost strata of the material from the full effects of the downward movement of the compressing head, the result of which has been to compress the block more upon its upper face than upon its lower face. By virtue of the construction herein shown and described, this difficulty is obviated. After the block has been sufficiently compressed, the handle 53 is operated to bring the interior of the cylinder 11 into communication with the exhaust pipe 56, thereby permitting the escape of the pressure fluid from said cylinder. This same movement of the valve, brings the pipe 76 into communication with the low pressure supply pipe 54 and admits fluid under low pressure to the cylinder of ram 30. This pressure fluid lifts the plunger of the ram 30 and through the rods 34 and bars 35, lifts the plunger 12 until the head 18 is clear of the mold box. Pressure fluid is then admitted to the rams 26 and 27 through the connections hereinbefore described and the mold box is elevated until it also is clear of the block, after which the pallet is swung over upon its hinge mounting as hereinbefore described, to cause the molded block to rest upon a pallet board 82 that is supported upon the bracket 77, after which the operation may be repeated.

From the foregoing description, it will be seen that simple and efficient means are herein provided for accomplishing the objects of the invention, but while the elements shown and described are well adapted to serve the purpose for which they are intended, it is to be understood that the invention is not limited to the precise construction set forth, but includes within its purview such changes as may be made within the scope of the appended claims.

What I claim is:

1. A machine of the character described, comprising a base and a fixed head, supporting members extending from said base to said fixed head, a ram in said fixed head, a vertically movable mold box, a swinging platen member adapted to enter said mold box, a presser head swingingly mounted upon the plunger of said ram, a second ram adapted to swing said swinging head out of alinement with said plunger, a third ram mounted upon said first named ram in vertical alinement therewith, connections between said third ram and said plunger, said third ram being adapted to elevate said plunger, and a pair of rams mounted upon opposite sides of said first named ram and adapted to elevate the mold box.

2. A machine of the character described, comprising a base and a fixed head, supporting members extending from said base to said fixed head, a ram in said fixed head, a vertically movable mold box, a swinging platen member adapted to enter said mold box, a presser head swingingly mounted upon the plunger of said ram, a second ram adapted to swing said swinging head out of alinement with said plunger, a third ram mounted upon said first named ram in vertical alinement therewith, connections between said third ram and said plunger, said third ram adapted to elevate said plunger, a pair of rams mounted upon opposite sides of said first named ram and adapted to elevate the mold box, and springs which yieldingly support said mold box a short distance above said base.

3. In a machine for molding concrete block, the combination with a base, a mold box movable with reference thereto, springs for supporting said mold box, a presser head means for moving the same laterally from the mold box, and means for moving the presser head into the mold box, and means independent of the springs for lifting the mold box to clear the same from the block.

WILLIAM L. KENY.

Witnesses:
M. U. RICKETTS,
G. JAEGER.

Copies of this patent may be obtained for five cents each, by addressing the "Commissioner of Patents, Washington, D. C."